United States Patent
Øhrn et al.

(10) Patent No.: US 11,991,125 B2
(45) Date of Patent: May 21, 2024

(54) INTELLIGENT SELECTION AND PRESENTATION OF ICEBREAKER PEOPLE HIGHLIGHTS ON A COMPUTING DEVICE

(71) Applicant: MICROSOFT TECHNOLOGY LICENSING, LLC, Redmond, WA (US)

(72) Inventors: Aleksander Øhrn, Oslo (NO); Shira Weinberg Harel, Herziliya (IL); Ola Lavi, Herziliya (IL); Omri Dvir, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 387 days.

(21) Appl. No.: 17/344,311

(22) Filed: Jun. 10, 2021

(65) Prior Publication Data
US 2022/0400090 A1    Dec. 15, 2022

(51) Int. Cl.
*H04L 51/02*        (2022.01)
*G06Q 50/00*     (2012.01)
*H04L 51/52*        (2022.01)

(52) U.S. Cl.
CPC ............. *H04L 51/02* (2013.01); *G06Q 50/01* (2013.01); *H04L 51/52* (2022.05)

(58) Field of Classification Search
None
See application file for complete search history.

(56) References Cited

U.S. PATENT DOCUMENTS

| | | | | |
|---|---|---|---|---|
| 2012/0096088 | A1* | 4/2012 | Fahmy | G06Q 30/02 709/204 |
| 2014/0095303 | A1* | 4/2014 | Jones | G06F 16/9537 707/706 |
| 2017/0017638 | A1* | 1/2017 | Satyavarta | G06F 40/253 |
| 2018/0041461 | A1* | 2/2018 | Kurani | H04L 51/08 |
| 2022/0121549 | A1* | 4/2022 | Shirwadkar | G06Q 30/0202 |

FOREIGN PATENT DOCUMENTS

WO        2021055959 A1        3/2021

OTHER PUBLICATIONS

"International Search Report and Written Opinion Issued in PCT Application No. PCT/US22/028651", dated Jun. 22, 2022, 10 Pages.

* cited by examiner

*Primary Examiner* — Kevin T Bates
*Assistant Examiner* — Emad Siddiqi
(74) *Attorney, Agent, or Firm* — Holzer Patel Drennan

(57) ABSTRACT

Technology is disclosed for selecting at least one icebreaker people highlight, with respect to a person of interest in a target group, to be shown on one or more user devices. The target group is determined, along with a set of feature values in common among the target group. Similarly, a reference group related to the target group is determined, along with a set of feature values for the reference group. For each feature value in the set of common target group feature values, a frequency of the feature value with respect to the determined reference group is determined. Based on the determined frequency, at least one icebreaker people highlight from the determined set of feature values in common among the target group is caused to be presented on the user device.

19 Claims, 9 Drawing Sheets

INTELLIGENT SELECTION AND PRESENTATION OF ICEBREAKER PEOPLE HIGHLIGHTS ON A COMPUTING DEVICE

BACKGROUND

Personal computing devices, such as laptops, computers, and smartphones, now carry and display a great variety of information and are used in a variety of settings. In turn, a variety of people may be encountered through these computing devices. Using these personal computing devices, people spend significant time in meetings (and increasingly online meetings) and communicating with other people, including time collaborating or working on teams. In these meetings, collaborations, and communications, it can be helpful to have contextual information presented about the other users or the group. For example, when a user has a meeting with, or communicates with, somebody the user does not know well, especially for the first time or the first few times, it would be useful to have an "icebreaker" fact handy, such as a rare fact, uncommon interest, or skill shared among the group.

Existing technologies can provide this sort of information about a user or information common to a group of users based on a manually chosen data comparison. For instance, an administrator may manually specify to compare education histories of users so that two users may be presented with an information highlight such as "You and Tom both studied at University of Washington." In one example, this information may be presented on a Live Persona Card ("LPC") or other user profile. Unfortunately, because this comparison is manually configured, it will be the same for all users (i.e., always showing common education backgrounds or whatever data fields are manually specified) and it may be presented every time (i.e., it does not change). Additionally, such a process is inefficient, as a human has to manually assess the icebreaker potential for every new field as a user profile grows, and then configure or program the system accordingly. An automated way of discovering and surfacing icebreaker people highlights would be beneficial. This existing, conventional technology is not designed with functionality to programmatically determine new types of information items that are common to a set of individuals, but rare in a population to which they belong, so that those information items may be presented to the set of individuals as an icebreaker. Or vice versa: it might also be an interesting icebreaker if the population to which a user belongs overwhelmingly shares a value that the individuals of a target group do not. (e.g., "You and Tom are the only ones in Texas who don't like western movies.")

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving selection of icebreaker people highlights, as information items, presented on personal computing devices (sometimes referred to herein as mobile devices or user devices). In particular, embodiments provide technology to selectively determine icebreaker people highlights to display on a user device based upon the presentation logic establishing some commonality of a feature value among a target group of users that is rare among a larger reference group of users. Such technologies improve the user experience in any of a number of computer applications and platforms.

BRIEF DESCRIPTION OF THE DRAWINGS

Aspects of the disclosure are described in detail below with reference to the attached drawing figures, wherein.

DETAILED DESCRIPTION

Figure 1:
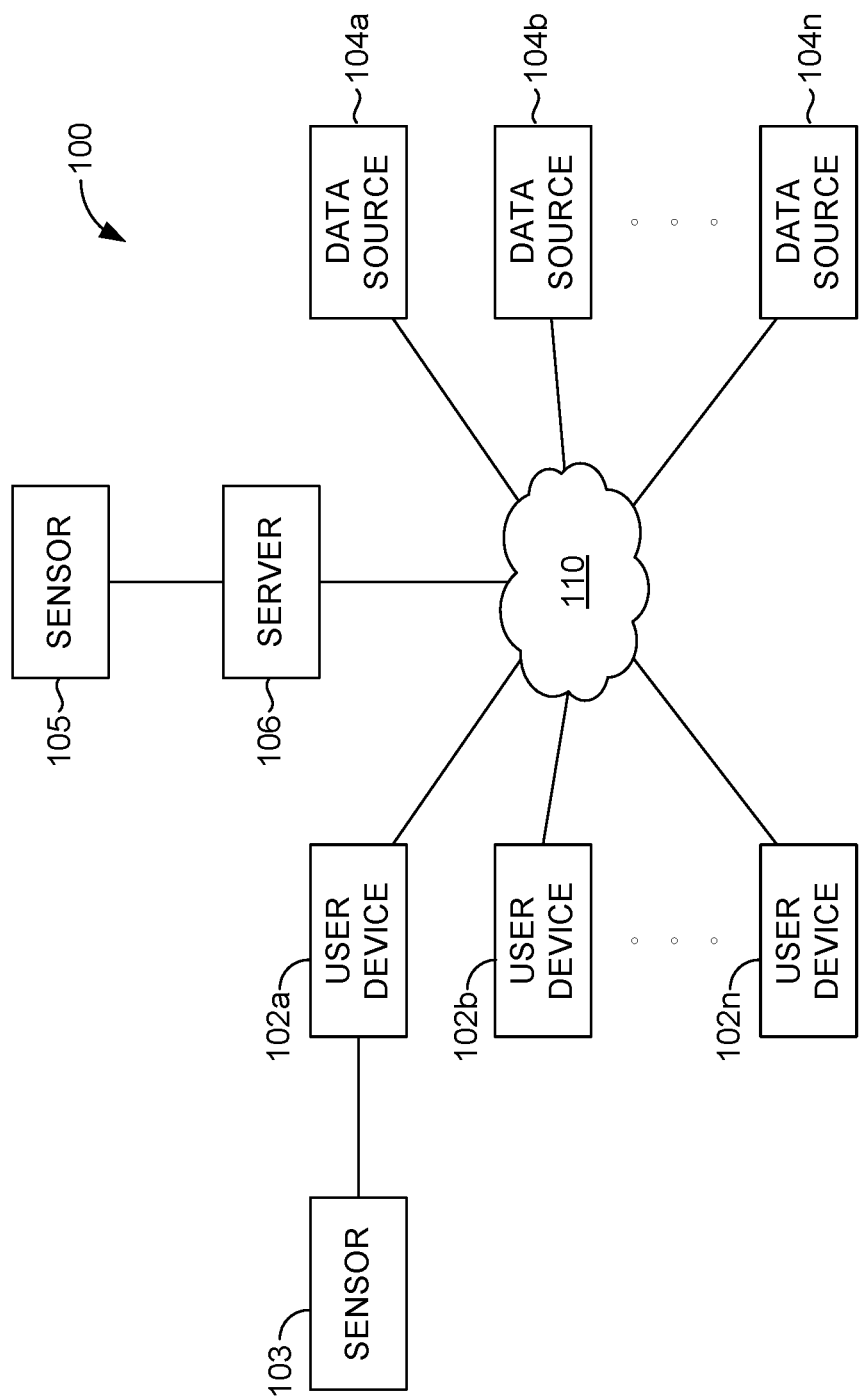
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for facilitating and improving icebreaker people highlights as information items presented on personal computing devices. The coalescence of telecommunications and personal computing technologies in the modern era has enabled, for the first time in human history, information on demand combined with a ubiquity of personal computing resources (including mobile personal computing devices and cloud-computing coupled with communication networks). As a result, it is increasingly common for users to rely on one or more mobile computing devices throughout the day for handling various tasks. It is also now possible to provide helpful information to the user regarding other people encountered on-line and relevant to a particular task, location, communication, application use, or other contextual situation, referred to collectively as icebreaker people highlight information or icebreaker people highlights. To be useful as an icebreaker people highlight, the information item should be common among a target group of users (those users interacting and receiving the icebreaker) but rare among a reference group (a population of people related to the target group in some way). Alternatively, an icebreaker people highlight may be interesting if it is very common among the reference group population, but absent from the target group. Embodiments, as described herein, thus address a need that arises from very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices.

Accordingly, solutions provided herein include technologies for improving, or providing improved control over, the presentation or display of icebreaker people highlights on computing devices. In particular, solutions are disclosed for programmatically selecting at least one icebreaker people highlight, with respect to a person of interest in a target group of people, to be presented on one or more user computing devices. The target group may be determined, along with a set of data feature values in common among the target group. Similarly, a reference group related to the target group is determined, along with a set of feature values for the reference group. For each (or at least one) of the data feature values in the determined set of data feature values in common among the target group, a frequency of the data feature value's occurrence among users in the reference group is determined. Based on this frequency of occurrence, a threshold (sometimes referred to herein as a "rarity threshold") may be applied. A data feature value having a frequency that satisfies the rarity threshold (e.g. is less than the threshold, indicating a lower occurrence frequency and thus a more rare feature value) then may be presented on the user device as an icebreaker people highlight. In some embodiments, the determined frequency of occurrence for the data feature value may be considered to indicate a rarity of the data feature value. Thus some embodiments may be considered to determine a rarity of each (or at least one) of the determined set of data feature values in common among the target group with respect to the determined reference group. Based on the rarity of each (or at least one) of the determined set of feature values in common among the target group, at least one icebreaker people highlight from the determined set of feature values in common among the target group is presented on the user device.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103 and 105; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a handheld communications device, a gaming device or system, an entertainment system, a consumer electronic device, a workstation, or any combination of these delineated devices, a combination of these devices, or any other suitable computer device.

Data sources 104a and 104b through 104n may comprise data sources and/or data systems, which are configured to make data available to any of the various constituents of operating environment 100, or system 200 described in connection to FIG. 2. For instance, in one embodiment, one or more data sources 104a through 104n provide (or make available for accessing) people data associated with a target group and/or a reference group, which may include user-activity related data, to people-data collection component 210 of FIG. 2. In some aspects, data sources can include a graph data structure associated with a person, a schematized user profile about a person, a JSON object of key/value structured information about a person. Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed people data made available by data sources 104a through 104n are described further in connection to people-data collection component 210 of FIG. 2. The source data from data sources 104a through 104n may include unstructured source data, semi-structured source data, and/or structured source data.

Figure 2:
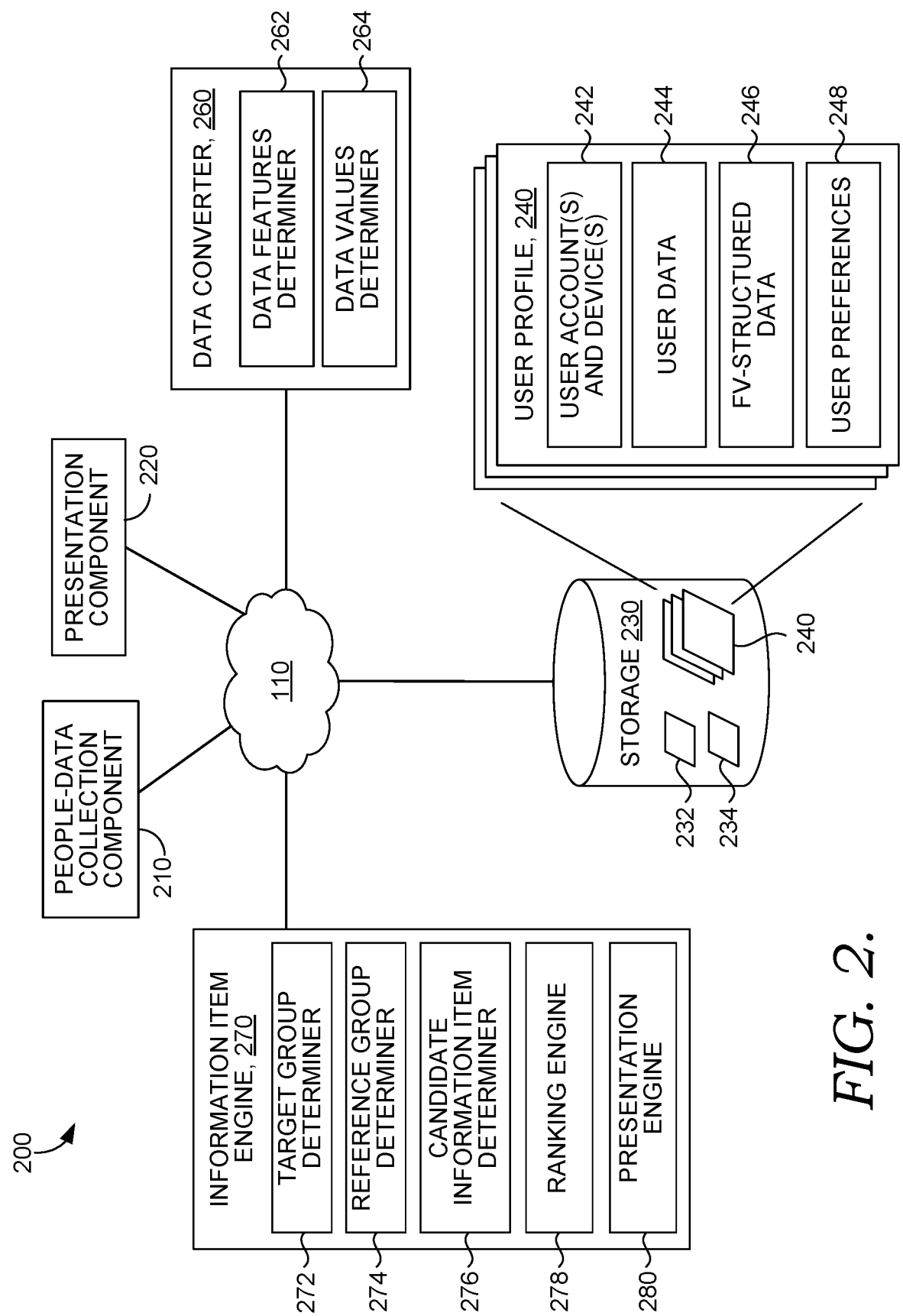
FIG. 2 is a diagram depicting an example computing architecture suitable for implementing aspects of the present disclosure.

Operating environment 100 can be utilized to implement one or more of the components of system 200, described in FIG. 2, including components for collecting people data; monitoring or determining user tasks, user activity and events, user patterns (e.g., usage, behavior, or activity patterns), user preferences, and/or similar categories of data regarding a person in a target group or a person in reference group, context data, or related information to facilitate providing an improved user experience; and/or presenting selected icebreaker people highlights to users. Operating environment 100 also can be utilized for implementing aspects of methods 400, 500, and/or 600 in FIGS. 4, 5 and 6, respectively.

Referring now to FIG. 2, with FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including people-data collection component 210, presentation component 220, storage 230, data converter 260, and information item engine 270. People-data collection component 210, presentation component 220, storage 230, data converter 260 and information item engine 270 may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of system 200 are associated with one or more applications, services, or routines to provide selected icebreaker people highlights in association with a person in a target group to provide an enhanced computing experience for the user. In particular, such applications, services, or routines may operate on one or more user devices (such as user device 102a) and/or servers (such as server 106). Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, or hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), or Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, people-data collection component 210 is generally configured to access or receive (and in some cases also identify) people data (with respect to both a person in a target group and a people in a reference group) from one or more data sources, such as data sources 104a and 104b through 104n of FIG. 1. In some embodiments, people-data collection component 210 may be employed to facilitate the accumulation of people data of a particular person in a target group (or in some cases, a plurality of people including crowdsourced data for people) for data converter 260 and/or information item engine 270. The data may be received (or accessed), and optionally accumulated, reformatted, and/or combined, by people-data collection component 210 and stored in one or more data stores such as storage 230, where it may be available to other components of system 200. For example, the people data may be stored in or associated with a user profile 240, as described herein. In some embodiments, any personally identifying data (i.e., people data that specifically identifies particular users) is either not uploaded or otherwise provided from the one or more data sources with people data, is not permanently stored, is de-identified, and/or is not made available to data converter 260 and/or information item engine 270. In some embodiments, a user may opt into or out of services provided by the technologies described herein and/or select which user data and/or which sources of user data are to be captured and utilized by these technologies.

People data, generally, may be any information that is related to a person, or group of people, that informs a user about an aspect of that person or group of people, and may be received from a variety of sources and may be available in a variety of formats. By way of example and without limitation, people data may comprise background information (e.g., education level, universities attended, employment experience); location information (e.g., a person's current location or location of a particular office where they work); presence; recent activity, which may comprise activity relevant to the user (e.g., that the person of interest has recently visited a particular place); task-related information; information about the person of interest that they may choose to share (e.g., birthday, anniversary, etc.); information related to employment (e.g., common project teams, reporting structures, work groups); or other information (e.g., skills, interests or hobbies). Additional examples of people data are described herein.

In some embodiments, people data received via people-data collection component 210 may be obtained from a data source (such as data source 104(*a*) in FIG. 1, which may be one or more databases, a graph data structure, a social networking site, a professional networking site, or other data source containing people data) or determined via one or more sensors (such as sensors 103 and 105 of FIG. 1), which may be on or associated with one or more user devices (such as user device 102*a*), servers (such as server 106), and/or other computing devices. As used herein, a sensor may include a function, routine, component, or combination thereof for sensing, detecting, or otherwise obtaining information such as people data from a data source 104*a*, and may be embodied as hardware, software, or both. By way of example and not limitation, people data may include data that is sensed or determined from one or more sensors (referred to herein as sensor data), such as location information of mobile device(s), properties or characteristics of the user device(s), user-activity information (for example: app usage; online activity; searches; voice data such as automatic speech recognition; activity logs; communications data including calls, texts, instant messages, and emails; website posts; other people data associated with communication events) including, user history, session logs, application data, contacts data, calendar and schedule data, notification data, social-network data, ecommerce activity, user-account(s) data (which may include data from user preferences or settings associated with a personalization-related application, a personal assistant application or service), global positioning system (GPS) data, other user device data (which may include device settings, profiles, network-related information, payment or credit card usage data, purchase history data, other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

People data, particularly in the form of contextual information potentially usable as an icebreaker people highlight, can be received by people-data collection component 210 from one or more sensors and/or computing devices associated with a user. In some embodiments, people-data collection component 210, data converter 260 (or one or more of its subcomponents), or information item engine 270, or other components of system 200 may determine interpretive data from received people data. Interpretive data corresponds to data utilized by the components or subcomponents of system 200 that comprises an interpretation from processing raw data, such as venue information interpreted from raw location information. Interpretive data can be used to provide context to people data, which can support determinations or inferences carried out by components of system 200. Moreover, it is contemplated that some embodiments of the disclosure use people data alone or in combination with interpretive data for carrying out the objectives of the subcomponents described herein. It is also contemplated that some people data may be processed, by the sensors or other subcomponents of people-data collection component 210 not shown, such as for interpretability by people-data collection component 210. However, embodiments described herein do not limit the people data to processed data and may include raw data or a combination thereof, as described above.

In some respects, people data may be provided in user-data streams or signals. A "user signal" can be a feed or stream of people data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, people-data collection component 210 receives or accesses data continuously, periodically, or as needed. In some embodiments, the people information/people data received by people-data collection component 210 is stored in storage 230, such as in user profile 240. The data collected/received by people-data collection component 210 may be unstructured data, semi-structured data, or structured data. For example, structured data may be received that is already schematized or logically stored in a structure according to a schema (e.g., a user profile, a JSON object of user information), or may be received as unstructured data or semi-structured data (e.g., labeled or tagged data; for example a tag or label corresponding to a feature/field and the data itself as a value. Thus a data item of "baseball" could be tagged/labeled as "sport," "hobby," "interest," etc.).

Data converter 260 receives or accesses data (such as data regarding a user, a person in a target group, or people within a reference group) from people-data collection component 210 and/or data stored in user profile 240 (which may be unstructured, semi-structured or structured data, or some combination of the foregoing) and converts the data into a structured feature-value ("FV") format usable by embodiments of this disclosure (such as information item engine 270). In some embodiments, data converter 260 uses conversion logic 232, which may be stored in storage 230. The output of data converter 260 is generally organized as FV pairs which express a relationship between a data feature (or data feature type) and a data value corresponding to the data feature. This FV format could be a taxonomy or ontology, which may be a vector, a table, a database, a graph structure, a JSON object, or other data structure having feature-value(s) relationships organized as feature-value pairs. The output of data converter 260 may be one-feature-to-one value (e.g., one data feature to one data value thus comprising a feature-value pair), or it may be one-feature-to-many values (e.g., one data feature to a set of corresponding data values). For example, if a person knows 3 languages: English, Spanish, and Sign language, the structured output might be, as an example: "Language: English; Spanish; Sign" or could be "Language: English; Language: Spanish; Language: Sign." The output could be expressed as a vector, as in: [Feature1: Value1a, Value 1b, Value 1c, etc.]. Or each value could be paired with a corresponding feature, as in: [Feature 1: Value1a; Feature1: Value1b; Feature1:Value1c; etc.].

In some implementations, the output may be hierarchical, as in:

Feature 1:
    Subfeature1a:Value1a

```
            Subfeature1b:Value1b
            Subfeature1c:
                SubSubfeature1c:Value1ca
                SubSubfeature1c:Value1cb
                Etc.
        For example:
        Skills:
            UX design
            GDPR Certification
            Applications:
                Excel
                PowerPoint
                Access
            Programming:
                Python
                Matlab
                Java
```

In some instances, a data feature and the corresponding data value for the feature are the same. For example, where the data feature only has one possible value, the data feature would thus indicate the data value. For example: within a company, the data feature (or data field): employer would be the company in every instance.

As seen in FIG. 2, data converter 260 may include subcomponents data features determiner 262 and data values determiner 264. The data features determiner 262 determines data-feature types (or data field types, in some embodiments), such as categories of the data. As described above, the data feature types may have a one-to-one correspondence to a data value or they may have a many-to-one or many-to-many correspondence to data value(s). The input to data features determiner 262 is the data received from people-data collection component 210 or accessed from user profile 240. Again, this data may be structured data, semi-structured data and/or unstructured data. For unstructured or semi-structured data, data features determiner 262 determines the features from the data that is received or accessed. For structured data in a format with data features, fields, tags, labels, etc., data features determiner 262 extracts the data features. The output of data features determiner 262 is a set of data features and may be output as a listing, a table, a vector, a set, a data structure or a similar data format. The data features determiner 262 may use data conversion logic 232 in storage 230 to determine the data features in the received or accessed data.

Data values determiner 264 determines one or more data values for each data feature determined by data features determiner 262. The input to data values determiner 264 is the output of data features determiner 262. The output of data values determiner 264 may be a structured set of data having data features and corresponding data value(s) (e.g., FV-structured data). As described above, data values determiner 264 may determine: one data value for the received data feature (one-to-one); multiple data values for the received data feature (many-to-one); or may determine a null data value where no data value corresponds to a particular data feature. The data values determiner 264 thus classifies values of the data according to the data features determined by data features determiner 262 and may use data conversion logic 232. In some embodiments, data converter 260 may determine if user's have opted in (or opted out) to having their data received and processed to determine FV-structured data for use in identifying information items for potential use as an icebreaker people highlight. And, in some embodiments, data converter 260 may specifically exclude certain feature types or data values (e.g., filtered out or never collected) to preserve user privacy. In some embodiments a user may specify a preference, stored in user preferences 248, indicating certain information to be excluded (e.g., previous employment history, birthday, user activity data or location data). These user preferences may be established by the user, or a system administrator, for example. The FV-structured data, as an output of data converter 260, may be stored in storage 230, such as in FV-structured data 246 in user profile 240.

Data conversion logic 232, used by data converter 260 (and/or data features determiner 262 and/or data values determiner 264) is used to determine data features and/or data values corresponding to data features. Data conversion logic 232 comprises computer logic that may include instructions, rules, conditions, associations, classification models, or other criteria to determine data features from a collection of data. The data conversion logic 232 can take many different forms. For example, the conversion logic may comprise: rules for a set of pre-defined data features (e.g., schematized fields) such as languages, interest, hobbies, skills, education level, travels, etc.; machine learning models; logic for determining fields based on clustering or binning the data; and/or instructions for performing semantic analysis of the data to determine a data feature type based on the specific data value (e.g., if the specific data is English, Norwegian, Vietnamese, Spanish, then the semantic analysis may determine these are all languages and specify the data feature type as "language"). Data conversion logic 232 may also comprise computer logic that may include instructions, rules, conditions, associations, classification models, or other criteria to determine data values corresponding to data feature types. For example, for a given data feature type, the logic may look for values in a defined set (e.g., for the feature type "language" look for a value or values corresponding to the thousands of known languages in the world). Data conversion logic 232 may also include rules for identifying data values based on the format of the data. For example, for the data feature type or category birthday or hire data, the rules may specific to look for a data value that is a day-month-year, or month-day-year, or MM/DD/YYYY or DD-MM-YY, etc. Other rules may be used to filter out or rule out data values for certain feature types or categories if a data value does not fit within the specified data value of the rule. In some embodiments, the rules discussed above may be part of a classifier, such as a decision tree. Data conversion logic 232 may also include classifiers and/or classification models, such as one or more machine learning classifiers that cluster or bin the data values according to feature type. For example, an artificial neural network, a support vector machine, a perceptron, a Naïve Bayes, a Decision Tree, logistic regression, K-nearest neighbor, or other machine learning or statistical classifiers.

Example system 200 also includes information item engine 270 that determines an information item to present to a user a possible icebreaker (an "icebreaker people highlight"). In general, information item engine 270 receives or access FV-structured data of people and determines one or more icebreaker people highlights to present. Information item engine 270 may include a target group determiner 272. Target group determiner 272, using rules or settings, determines one or more users in a target group. In some embodiments, the determined target group may comprise attendees, participants and/or recipients of a communication session (e.g., a chat or an email) or meeting. As one example, the target group may comprise a first user, and a second user with whom the first user is interacting or corresponding to information with which the first user is interacting (e.g., if the first user hovers a mouse over the name of a second user—the target group would be the first user and the second user. In some embodiments, the target group determiner 272 operates dynamically, determining the target group based on current and changing attendees of a group meeting as new people join and leave the meet.

The information item engine 270 may also include a reference group determiner 274 that determines one or more reference groups based at least on the determined target group (from target group determiner 272). So, the input to reference group determiner 274 is a person/user of the target group, and, in some embodiments, can also be a particular data-feature. For example, a reference group population may be determined based on a particular data feature. Reference group determiner 274 outputs a reference group or reference population of people. The reference group determiner 274 utilizes reference group logic (which may be stored in storage 230) comprising rules or algorithm(s) for determining a reference group based on a target group (two or more individuals), and in some embodiments, based on data features associated with the target group. In some embodiments, the algorithm(s) to determine a reference group is the same always. In other embodiments, the algorithm(s) may vary based in part on the particular data feature(s) associated with the target group and/or based on the size of the reference group (e.g., a minimum or maximum size or size-range of the number of people in the reference group). In other embodiments, the reference group logic utilized by reference group determiner 274 comprises a decision tree.

To provide context, a number of different examples are given below for reference group logic utilized by the reference group determiner 274. The given examples are not intended in any way to be limiting. One example algorithm includes within a reference group all people under a manager in common with people in the target group. In this first example algorithm, for each person in the target group, the algorithm has instructions to crawl up the line of supervisors for individuals in the target group until a common supervisor is identified (i.e., a supervisor that supervises a population that includes every member of the target group). The reference group logic using this algorithm then determines the total population that the "common supervisor" is responsible for supervising. This population is then defined as the reference group. As a second example, the reference group logic algorithm may have instructions for determining an intersection of common co-workers or acquaintances. In this second example, the algorithm, for each person in the target group, determines the co-worker population of the person, or may determine the acquaintance-circle (i.e., the people the person knows, their friends, or people they regularly interact with (such as a contact list or their social media friends or followers). Once determined, the algorithm determines the intersection of the co-worker populations or user circles for each target group user. In this second example, the reference group determined by reference group determiner 274 is the intersection (i.e., the people in common to each co-worker population and/or user acquaintance circle). In a third example, the reference group logic utilized by reference group determiner 274 includes instructions that determine a union of common co-workers and/or acquaintance circles. In this example, for each person in the target group, the logic determines a co-worker population or an acquaintance circle. Then, the logic determines the union of the determiner co-worker populations or acquaintance circles. The union (i.e., all of the people in the co-worker populations or acquaintance circles) is output as the reference group. As one more example, the reference group logic utilized by reference group determiner 274 may have instructions for identifying people in the same: organization; company; office; affiliation; region, etc. Based on the data for each person in the target group, the reference group logic identifies the reference group as those people within a common organization, the same company, the same office, the same affiliation or the same region, for example.

In some embodiments, a reference group size may need to be a minimum or maximum size, or a range. The reference group logic utilized by reference group determiner 274 may include rules or criteria always applied or based on specific feature categories relative to a reference group size (e.g., for the skills feature type any reference group size is acceptable, but for the language feature type the reference group size needs to be at least a certain number).

In some instances and where possible, once an initial reference group is determined by reference group determiner 274, it may be checked to see if it satisfies a criteria (e.g., a criteria for a particular data feature type), and if the rule is not satisfied, then the reference group may be expanded or reduced. For example, the determined reference group may be enlarged by including to the next higher level manager, expanding the region, etc. until the rule or criteria is satisfied. Similarly a reference group may be reduced in size by taking, for example, only those close-acquaintances of the user, or only those co-workers with which the user interacts at a minimum level of frequency. In other instances, if the determined reference group does not satisfy given rules or criteria then that corresponding information item (determined from candidate information item determiner 276, described below) is not used (i.e., an identified icebreaker people highlight from that reference group is not used, because the reference population is not reliable).

Information item engine 270 also includes a candidate information item determiner 276. In some embodiments, candidate information item determiner 276 uses feature-value ("FV") logic 234 to determine one or more possible information items to present to a user as a potential icebreaker people highlight. Candidate information item determiner 276 may take as inputs the target group determined by target group determiner 272 and the reference group determined by reference group determiner 274. The output from candidate information item determiner 276 is a set of FVs representing candidate information items for possible presentation as icebreaker people highlights. In some embodiments, each FV has a corresponding rarity score indicating how uncommon the FV is for a given reference group.

FV logic 234 is used by candidate information item determiner 276 to compare data-feature values (also called data FVs) of users in a target group and reference group in order to determine a set of FVs representing candidate information items for potential presentation to a user as an icebreaker people highlight.

FV logic 234 comprises computer-logic (e.g., instructions) that may include may include rules, conditions, associations, classification models, or other criteria that operate on information associated with a target group and a reference group for performing the comparison of feature values (FVs) to determine a candidate information item. Some embodiments of FV logic 234 may comprise one or more algorithms or decision tree(s).

In some embodiments, FV logic 234 includes logic for performing comparison to equality or to determine similarity. For example, two FVs may be compared and if the values are the same, then they are determined to be equal. In some embodiments a similarity comparison may be performed based on a distance of FVs, such as by using a graph or database, and FVs that are within a threshold of similarity (e.g., a similarity threshold, which may be defined or based on the particular FV, the target group, and/or reference group, such as a threshold distance of similarity or within a specified range of variance) are determined to be similar.

In some embodiments synonyms of FVs are determined and used for the comparison. In some embodiments, an FV may be referenced in a table to determine equivalent or similar FVs for use in the comparison. For example, a first FV for running and a second FV for jogging may be determined to be similar or equivalent in the comparison.

In some embodiments, a hierarchical relationship similarity such as a genus-species may be determined for a FV and used for the comparison. For example, if a first user has an FV indicating they like baseball and a second user has an FV indicating they like basketball, then a comparison of the FVs may determine that both users like sports, because baseball and basketball are species within a genus of sports. Similarly, if a first user has an FV indicating they visited Oslo, and a second user has an FV indicating they visited Norway, then a comparison of the FVs may determine that both users have visited Norway, because Oslo may be considered a data species of the data genus Norway. In some embodiments a table-lookup or index may be used to determine a genus-species for a FV or a semantic analysis on the FV may be used to determine a genus or a set of one or more potential species.

As described above, some embodiments of FV logic 234 may comprise one or more algorithms or decision tree(s). Several example algorithms are described below. Each example is meant to provide context, but is in no way intended to be limiting.

As a first example algorithm, as a first step, for each target user in the target group identify a set of common target group FVs (e.g., everyone in the target group speaks Elfdalian). In this first step, for each FV in the target user's data (i.e., their FV-structured data, which may come from a data profile, graph, data object, data structure, or similar set of data) perform a comparison of that FV to the FVs of other target users in the target group. Alternatively, for a given feature type of a target user, compare the FVs or the first target user to the value(s) of the corresponding feature type for each of the other target users in the target group. In this way a comparison is performed among the FVs of the target group to identify a set of common target group FV(s). Then, as a second step, for a reference group determined based at least on the target group (and in some embodiments, further determined based on the common target group feature type (e.g., languages spoken) or the FVs), determine a frequency that a target group FV occurs in the data of the reference group. In other words, compare each of the target group FVs to the FVs in the reference group in order to determine how many people in the reference group have that same or similar FV. Thus each compared target group FV will have a corresponding number (referred to herein as a rarity score) indicating how often the FV occurs in the reference group population (e.g., 0.5 or 50% indicates that half of the reference group users have that FV). The second step in this example outputs or provides the set of the target group FVs and a corresponding rarity score for target group FVs.

As a second example algorithm, as a first step and for a reference group corresponding to the target group, determine the occurrences count of FVs among users of the reference group. (In other words, determine a count of how often each FV occurs in the reference group. Thus a commonly occurring FV in the reference group will have a higher occurrences count.) As a second step, rank the FVs according to the determined occurrences counts for the FVs. Then, as a third step, determine a set of n data FVs corresponding to the lowest occurrence counts in the ranking. This set of n data FVs comprises the set of "rare" data FVs in the reference group. As a next step, determine if all members of the target group share any of the rare data FVs in the set. And, if the target group shares a rare data FV, designate that rare FV as a candidate information item.

A third example algorithm for identifying a candidate information item showing a common dissimilarity within the target group is described below. An example common dissimilarity icebreaker people highlight could be identifying that members of the target group are the only people within the reference group that do not like sports. As a first step in this example algorithm, for a reference group, for each data FV of each reference user in the reference group, determine if that FV is present in the data of each target user in the target group, to form a set of FVs that are not present in the target group. This identified set of FVs not present in the target group is a dissimilarity information item. That is, this set of FVs are candidate icebreakers for dissimilarity for the target group.

Returning to information item engine 270, the ranking engine 278 receives, as input, a set of FVs that are candidate information items (candidate icebreaker people highlights) generated by candidate information item determiner 276. Ranking engine 278 determines or ranks the candidate information items so that the top ranked information item(s) may be considered for presentation. The output of ranking engine 278 is a set of one or more rare FVs that is passed on to a presentation engine 280 to be formatted as an information item, and presented.

Ranking engine 278 may utilize computer logic (e.g., instructions) that may include rules, conditions, threshold(s), classification models, or other criteria that apply a ranking to the set of FVs that are candidate information items. The ranking logic of ranking engine 278 can take many different forms. For example, the ranking logic may comprise Boolean logic, fuzzy logic, decision trees or random forest, finite state machine, support vector machine, logistic regression, clustering, topic modeling, or machine learning techniques, similar statistical classification processes or, combinations of these to rank the received set of people highlights.

In some embodiments, ranking engine 278 may rank the FVs based only on the rarity score or may initially rank or order the FVs based on the rarity score and then further rank or prune the FVs based on other criteria. As one example, the ranking engine 278 may use a data-feature specific ranking. In data-feature specific ranking, the ranking of FVs may be based in part on their corresponding data feature types. For example, certain data feature types may get a higher ranking than other data feature types (e.g., languages data feature type may be ranked higher than skills data feature type). This preference may be pre-defined (e.g., by an administrator or user settings) or may be learned based on user interactions (e.g., user-interaction popularity). As another example, the ranking engine 278 may use a data-feature popularity (or interaction frequency) ranking. This ranking is a measure of the frequency of user interaction with (or dismissal of) a particular data feature corresponding to an FV. (For instance, how often users click on or interact with that data feature when it is presented as a highlight, or how often users dismiss it, in implementations having a function for dismissal or hiding a highlight.) A higher interaction frequency (i.e., higher interest) may promote an FV to a higher ranking. As yet another example, the ranking engine 278 may use a data-feature history ranking. In data-feature history ranking, for the target group, the ranking logic consider the frequency with which the data feature corresponding to an FV has been presented. (For example, if in the last meeting with this target group, the icebreaker "you all speak Russian" was presented, then the same icebreaker would likely be less valuable to users, and a different icebreaker would be ranked higher.) In some embodiments, the ranking engine 278 may utilize a randomizer logic. Using this logic, a wild card that pseudo-randomly alters the ranking of the FVs (or the top most-ranked items). This random logic could also be used to select the final one or more FVs to be presented from a candidate set such as by pseudo-randomly selecting a set of one or more FVs for presentation from the set of FVs representing the candidate information items.

In some embodiments, ranking engine 278 further comprises a threshold (which may be referred to herein as a "rarity threshold") for pruning or reducing the set of FVs representing the candidate information items to a set of one or more FVs for presentation to the target group, which may be one or more rare FVs. For example, a rarity threshold may be applied to the ranked set of FVs, and those items that satisfy the threshold become a reduced set of one or more FVs representing icebreaker information items for presentation. In some embodiments, a rarity threshold may be specific to a particular data feature corresponding to an FV. (Thus there may be multiple thresholds that are used based on the particular data feature types of the FV.) In some embodiments, the threshold may be dynamically set or adjusted, such as based on user-interaction frequency of a data feature type corresponding to a FV (e.g., a data feature type with a high user-interaction raises the threshold so FVs with that data feature type are more likely to be presented). The threshold could also be randomized (or pseudorandomized) to provide a dynamic user experienced.

Information item engine 270 further includes the presentation engine 280 which determines and prepares icebreaker information items for presentation. The input to presentation engine 280 is at least one of the rare FVs output from candidate information item determiner 276 and/or ranking engine 278. The output of presentation engine 280 (which is also the output of information item engine 270) is passed to presentation component 220. Presentation engine 280 may also specify the format of the presentation of the information item (e.g., a notification on an LPC (see FIG. 3A), a meeting "whisper" notification (see FIG. 3B), or a notification on a communication feed (see FIG. 3C), etc.) and presentation logic (e.g., present for three minutes at the beginning of a meeting, when a new user enter the meeting, or rotate/alternate displaying a set of information items every thirty seconds, for example).

In some embodiments of presentation engine 280, a determination is made as to whether an information item will be presented at all. For example, a degree of familiarity may be determined between users in the target group such that if they have sufficient familiarity with each other, then no icebreaker information item is presented. A degree of familiarity may be determined, for example, based on whether the target users have worked together previously, how often they have worked together, and/or how recently the target users have worked together. In this way and for these embodiments, icebreaker information items are more likely to be presented when users in the target group do not know each other.

Example system 200 may also include a presentation component 220 that is generally responsible for presenting the information items, such as the icebreaker information items received from information item engine 270, and may work in conjunction with presentation engine 280. The content may be presented via one or more presentation components 716, described in FIG. 7. Presentation component 220 may comprise one or more applications or services on a user device, across multiple user devices, or in the cloud. For example, in one embodiment, presentation component 220 manages the presentation of icebreaker information items to a user across multiple user devices associated with that user, and may use presentation logic determined by presentation engine 280. For example, presentation component 220 may determine on which user device(s) content is presented, and presents information determined by information item engine 270. In some embodiments, presentation component 220 can present icebreaker people highlights proactively and dynamically, such as when a new user first speaks, or enters an on-line meeting, or joins an on-line chat session. For instance, presentation component 220 may determine when, whether, and how to determine an icebreaker people highlight (or other information item), based on presentation logic of presentation engine 280 or information item 270. Similarly, in other embodiments, presentation component 220 includes functionality to enable users to see a preview of icebreakers associated with a virtually assembled target group (i.e., a user selects or shows an interest in another person and can view the icebreakers associated with that person). Presentation component 220 presents this information, including any substitutions, reorganizations, or highlights as directed by the information item engine 270. One or more of the candidate information item determiner 276, ranking engine 278, or presentation engine 280 may also determine how many icebreaker people highlights, if any, should be presented to the user (and instruct presentation component 220). This determination might be made, for example, based upon the device's screen size (with potentially more or differently formatted icebreaker information items presentable on a laptop computer as compared to a cell phone) or the surface on which the icebreaker will be presented (for example a calendaring application, communication platform, or other application or program). The presentation component 220 can present, in a graphical user interface ("GUI"), in a number of different formats and applications, such as those shown in FIGS. 3A-3C (discussed further below).

Example system 200 also includes storage 230. Storage 230 generally stores information including data, computer instructions (e.g., software program instructions, routines, or services), logic, profiles, and/or models used in embodiments described herein. In an embodiment, storage 230 comprises a data store (or computer data memory). Further, although depicted as a single data store component, storage 230 may be embodied as one or more data stores or may be in the cloud.

As shown in example system 200, storage 230 includes user profile 240, conversion logic 232 and FV logic 234. One example embodiment of a user profile 240 is illustratively provided in FIG. 2. Example user profile 240 includes information associated with a particular user such as user account(s) and devices data 242, user data 244, FV-structured data 246 and user preferences 248. The information stored in user profile 240 may be available to information item engine 270 and other components of example system 200.

User account(s) and device(s) data 242 generally includes about user devices accessed, used, or otherwise associated with a user, and/or information related to user accounts associated with the user; for example, online or cloud-based accounts (e.g., LinkedIn®, email, social media) such as a Microsoft® Net passport, other accounts such as entertainment or gaming-related accounts (e.g., Xbox® live, Netflix®, online game subscription accounts, or similar account information), people data relating to such accounts such as user emails, texts, instant messages, calls, other communications, and other content; social network accounts and data, such as news feeds; online activity; and calendars, appointments, application data, other user accounts, or the like. Some embodiments of user accounts and devices 242 may store information across one or more databases, knowledge graphs, or data structures. As described previously, the information stored in user accounts and devices 242 may be determined from people-data collection component 210.

User data 244 may include unstructured data, semi-structured data, and structured data not yet converted into FV-structured data. User data 244 may be populated by data received from people-data collection component 210 and may include similar types of information to that discussed above with respect to user account(s) and device(s) data 242.

FV-structured data 246 is user (or people) data outputted by data converter 260 is a structured format, such as data-feature and corresponding data value(s). In some embodiments, FV-structured data 246 comprises a logical index to data stored in user data 244, such that the data is not copied into FV-structured data 246 but is stored only in user data 244.

User preferences 248 generally include user settings or preferences associated with the user, and specifically may include user settings or preferences associated with the information item engine 270. By way of example and not limitation, such settings may include user preferences about specific icebreaker people highlights or icebreaker people highlight categories that the user desires to be presented or suppressed given certain user contexts. The user may specify which data or content should be included for use with the information item engine 270. In one embodiment, preferences 248 may include user-defined rules (or group-policy rules, which may be set by an administrator) for presenting icebreaker people highlights based on a context; for instance, suppressing specifically designated icebreaker people highlights that are deemed unhelpful or undesirable to a specific user. Further, a graphical user interface may facilitate enabling the user to easily create, configure, or share these user-preferences. For example, in one embodiment, right-clicking on (or touching, or otherwise selecting) a particular people highlight may invoke a menu, a rules wizard, or other user interface that enables the user to specify treatment (i.e., whether to show or suppress a particular icebreaker people highlight and according to which context) of that particular icebreaker people highlight or similar icebreaker people highlights.

Figure 3A:
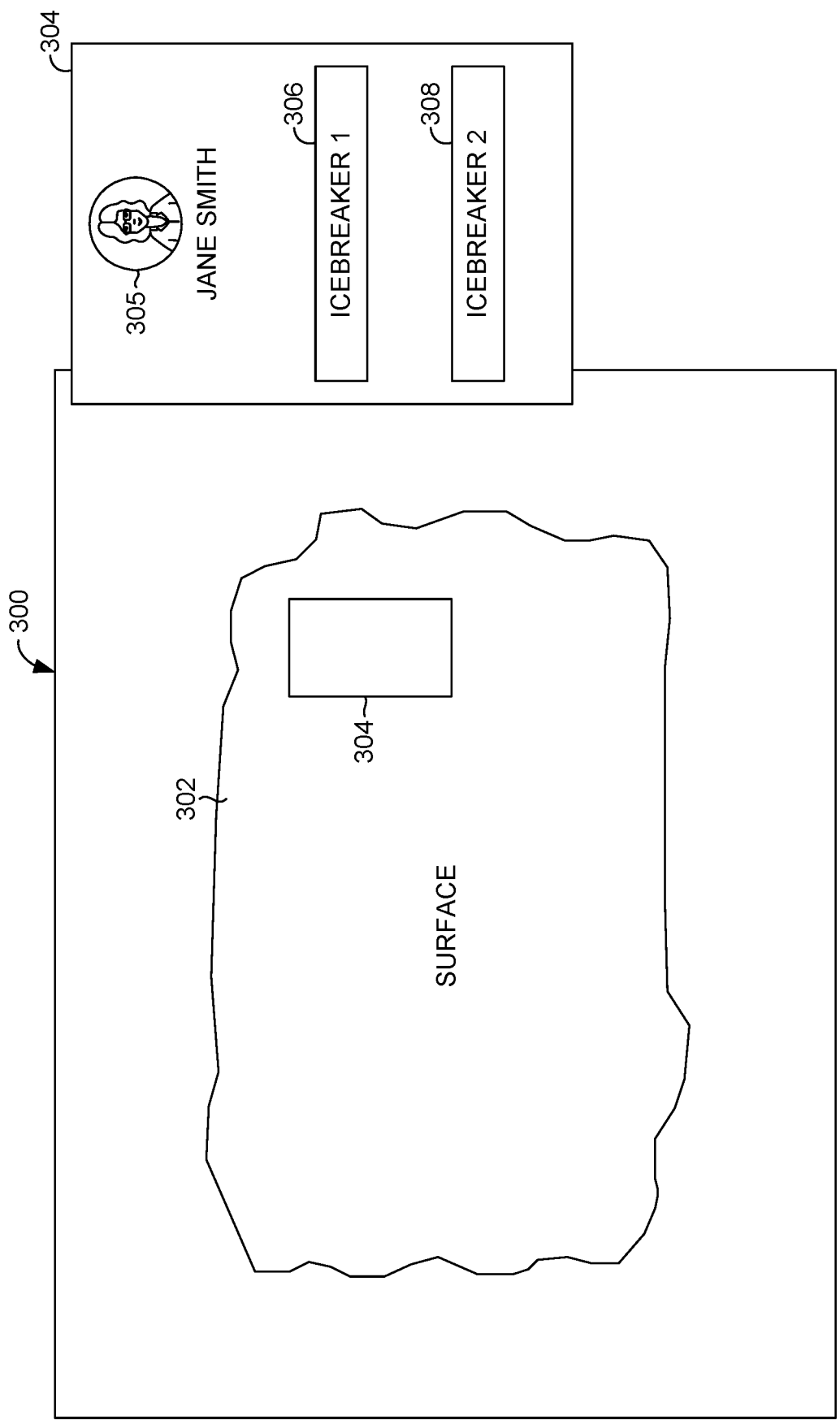
FIGS. 3A-3C illustratively depict exemplary schematic screenshots from a personal computing device showing aspects of example graphical user interfaces, in accordance with an embodiment of the present disclosure.

An exemplary schematic screen display 300 is shown in FIG. 3A, which represents any of the computing device(s) 102(n) discussed above with respect to FIG. 1. Screen display 300 is shown having a schematic surface 302, which could be any of a number of different programs, applications or other display on the computing device screen display 300. A smaller display space 304 is shown, which could be, for example, a Live Persona Card (LPC) or other type of informational display. Within display space 304, a number of icebreaker people highlights are shown as Icebreaker 1 (306) and Icebreaker 2 (308) for an example person (305). In this exemplary screen display 300, two icebreakers are shown and may be the highest two icebreakers ranked by ranking engine 278. These icebreakers could be any of a number of different icebreaker people highlights. Only to provide context, and as non-limiting examples, these presented icebreakers could be: "You and Scott both speak Elfdalian;" "You and James both report to Aleksander;" "Neither you or Ola like sports;" "You and Shira both visited Café Puaa, Tel Aviv-Yafo;" "You all visit the gym regularly;" or "You all visit Stockfleths Lille Grensen coffee shop every Friday." Again, any of the above-described icebreaker information items may be presented, and the immediately preceding list is provided only for context.

Figure 3B:
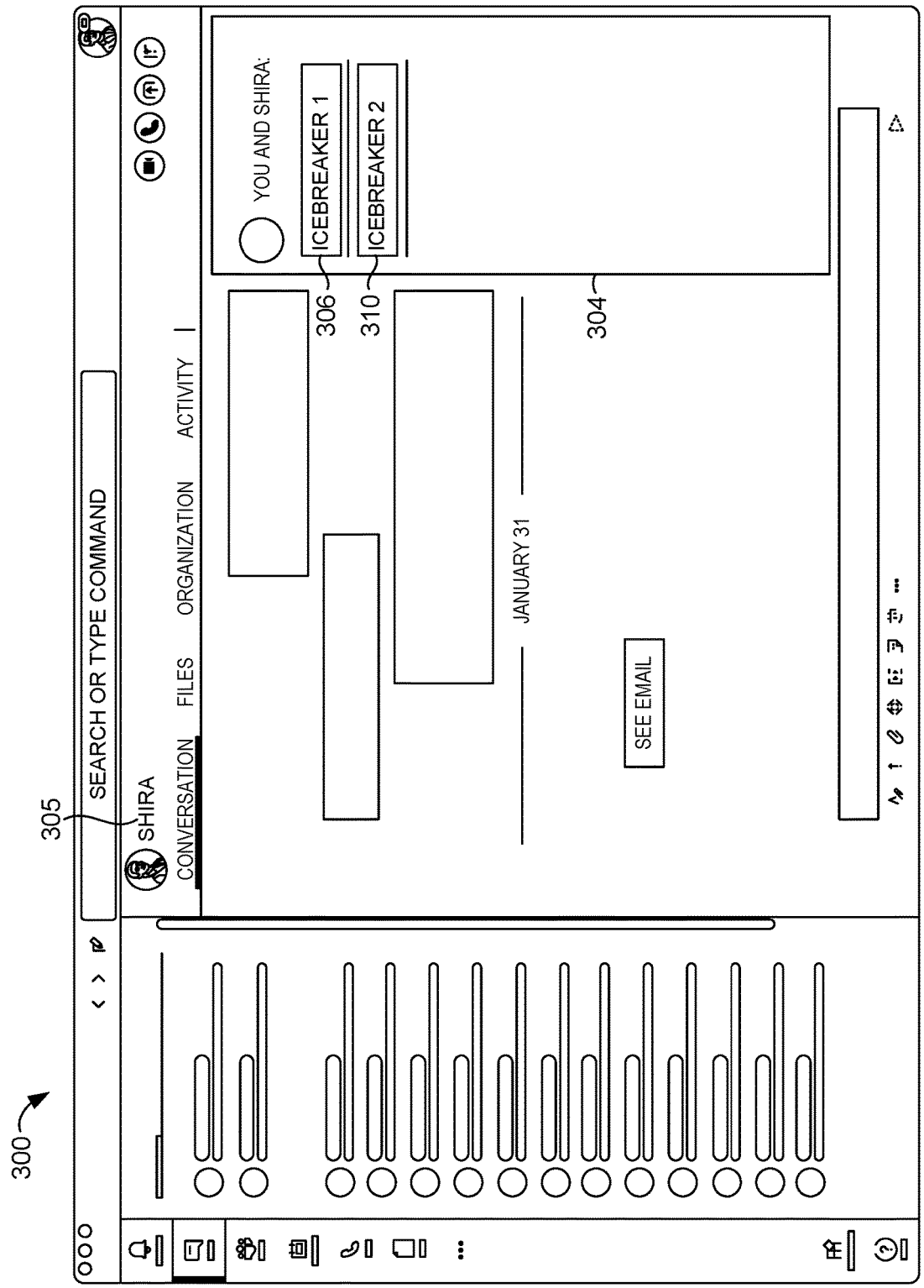
Figure 3C:
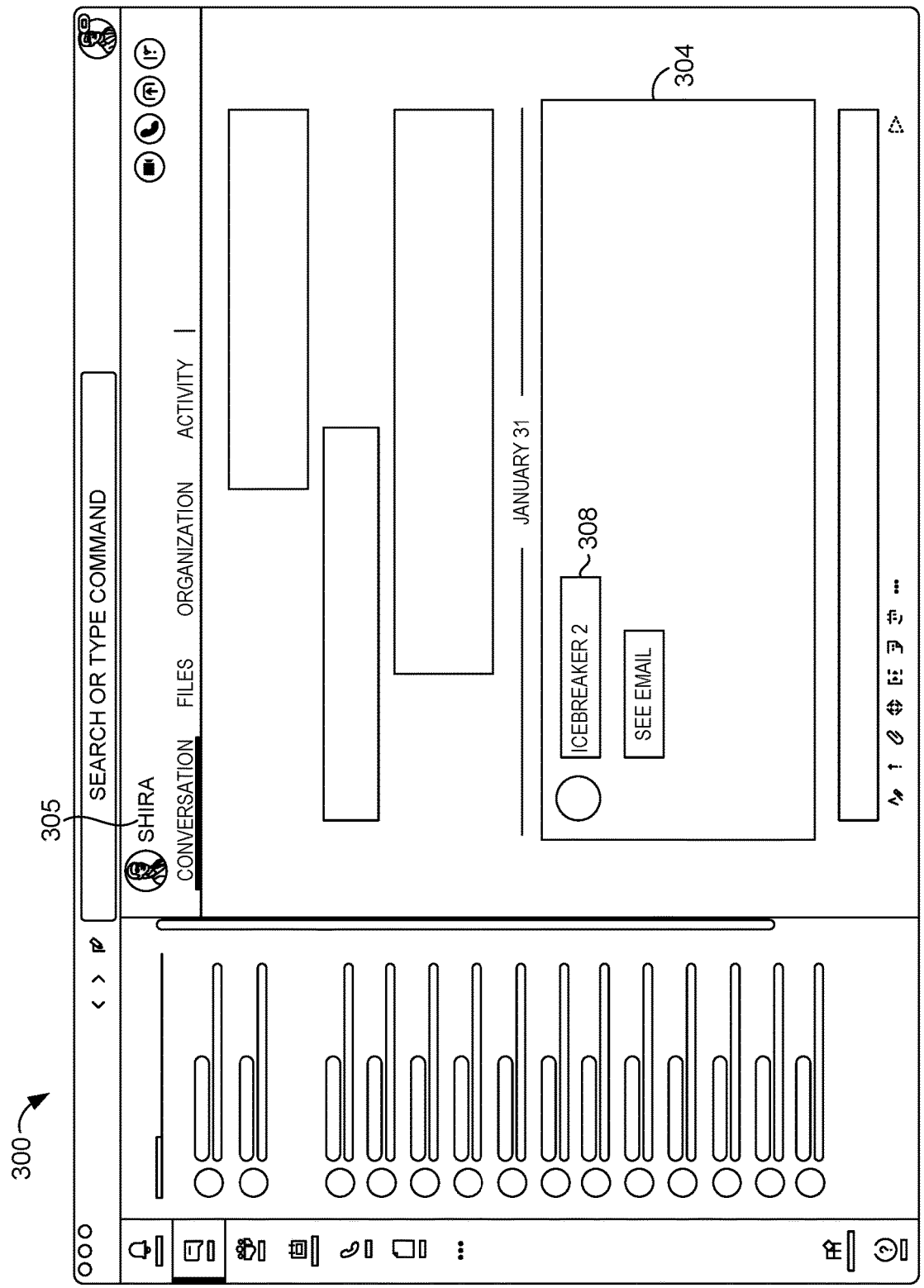

Another exemplary screen display 300 is shown in FIG. 3B, which also shows two people highlights. Here, however, display space 304 is part of a relationship pane or a "whisper" within a chat window of collaboration platform or on-line meeting platform (such as Microsoft Teams®). The icebreaker people highlights shown are Icebreaker 1 (306) and Icebreaker 3 (310). The difference between FIG. 3A and FIG. 3B is that Icebreaker 2 (308) is replaced by Icebreaker 3 (310). This difference may be the result of a different platform (here an on-line meeting platform), or due to the applied logic or rules (such as those discussed above with respect to ranking engine 278). In some embodiments the icebreaker people highlights presented can be updated dynamically as new people enter the meeting, chat session or as the user interacts with the person. This embodiment can be especially useful for a real-time presentation scenario, such as when another user enters or leaves a Teams® meeting or chat session with the user. Another exemplary screen display 300 is shown in FIG. 3C, which shows one icebreaker people highlight, Icebreaker 2 (308) presented within a chat feed. As with the example shown in FIG. 3B, the presented icebreaker can change dynamically, and a new or different icebreaker may be presented when a new user joins the chat, or a user goes to the chat for the first time.

Figure 4:
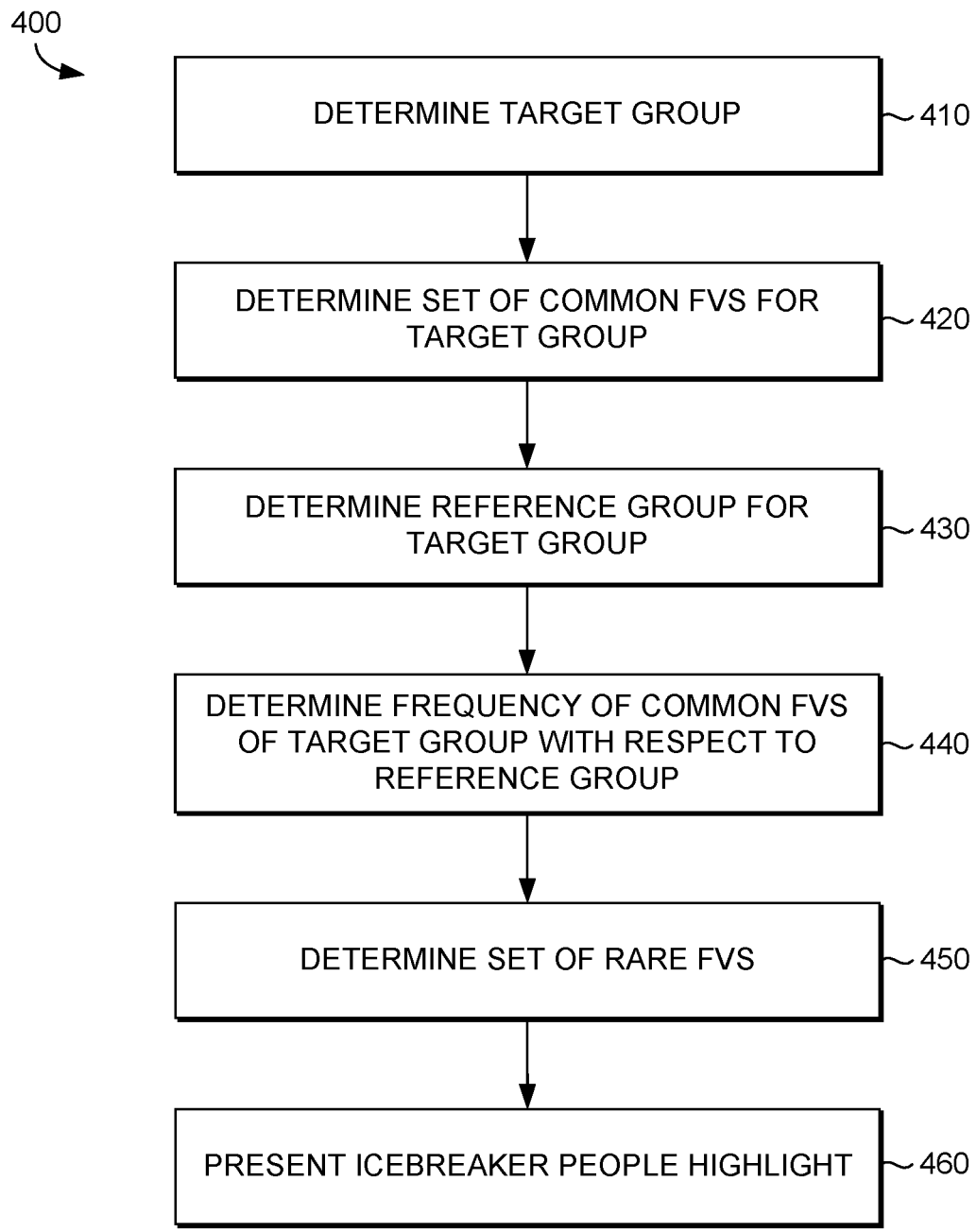
FIG. 4 depicts a flow diagram of a method for intelligently selecting and presenting icebreaker people highlights to a user, in accordance with an embodiment of the present disclosure.

Turning to FIG. 4, a method 400 for determining and presenting an icebreaker people highlight (information item) on one or more user devices is shown. As shown at block 410, the method 400 includes determining a target group of two or more users. This determination may be determined based on the attendees/participants/recipients of a communication session (e.g., a chat or email) or meeting, may comprise a first user and a second user that the first user is interacting with or corresponding to information that the first user is interacting with, or other parameters and criteria described in connection with target group determiner 272. Each user in the determined target group has corresponding FV-structured data comprising data features and for each data feature, at least one corresponding data value thereby forming a set of data feature-values (FVs) in the user's structured data.

As shown in block 420, the method 400 continues by determining a set of common FVs for the users in the target group determined in step 410. In one embodiment, in step 420, for each FV of each person in the target group, the method performs a comparison of the FV to each of the FVs of the other target group users to determine a set of similar or in-common FVs to the target group. In another embodiment, in step 420, for each of the data feature types of the target users, the method compares each of the target users' data values of each data feature type to determine a set of similar or in-common FVs to the target group. In some embodiments, the comparisons of FVs among target group users discussed above with respect to step 420 is performed using feature-value logic 234.

As shown at block 430, the method 400 continues by determining a reference group, based at least on the target group. Embodiments of step 430 may be performed as described in connection with reference group determiner 274. In some embodiments, the reference group also may be determined based on a common FV of the target group, such as described in connection with reference group determiner 274. Each user in the reference group has corresponding FV-structured data comprising data features and for each data feature, at least one corresponding data value thereby forming a set of data feature-values (FVs) in the user's structured data. The reference group determined in step 430 includes the target group determined in step 420. In step 410 and/or step 430, the corresponding FV-structured data for each user may comprise a user data profile, a user graph, a JSON object, or a key-value(s) structure. Step 410 and step 430 may further comprise determining the structured data from a source data comprising at least one of unstructured source data, semi-structured source data and structured source data. In some embodiments, the source data comprises information from a social media account or item associated with a user, communications information associated with the user (e.g., chats, email, conversations), or user-activity detected or generated on a user device of the user.

Method 400 continues at step 440 by determining a frequency of each (or at least one) common FV shared by the target group with respect to the FVS of the reference group. In some embodiments, step 440 determines a rarity score for each FV shared by the target group, based on a comparison of the shared FVs of the target group to the FVs of the reference group. In some embodiments, in step 440, for each of the FVs shared by the target group (i.e., for each of the in-common target group FVs) the method logic determines a frequency or a count of the number of times the FV occurs in the structured data of users in the reference group. Thus each in-common (i.e., shared) target group FV has a count indicating the number of times that particular FV occurs in the reference group. This count, which represents the frequency, may be referred to as a "rarity score." Thus for example a rarity score of 0.5 or 50% means that half of the reference group users have the FV shared by the target group. A rarity score of 0.1 or 10% (meaning that a smaller percentage of the reference group have the FV shared by the target group would result in a higher ranking and would be more likely used as an icebreaker people highlight. Embodiments of step 440 may be performed by candidate information item determiner 276 and/or using feature-value comparison logic 234. Additional details of embodiments of step 440 are described in connection with candidate information item determiner 276. At the end of step 440, the method 400 produces a set of shared FVs for each user in the target group, and each of those FVs has a corresponding occurrence frequency or rarity score.

In step 450, the method 400 continues by determining a set of rare FVs, from the in-common FVs shared by the target group, based at least on the rarity scores of step 440. In one embodiment, step 450 ranks the shared FVs as described in connection with ranking engine 278, based at least on the rarity score. In some embodiments, step 450 may be performed by reference ranking engine 278 (or information item engine 270) of FIG. 2. In some embodiments the ranking may be adjusted based on one of more data feature types of the FVs shared by the target group. In some embodiments, as a part of step 450, the method includes applying a rarity threshold to the ranked shared FVs to determine a set of rare FVs. The threshold may be dynamic and/or may be specific to the feature type of an FV. Additional details of thresholds and applying thresholds in step 450 are described in connection with ranking engine 278.

In step 460, the method 400 concludes by presenting at least one rare FV as an icebreaker (information item) people highlight on a user device associated with at least one user of the target group. In some embodiments, step 460 determines an information item people highlight from at least one FV from the set of rare FVs, and then presents the information item people highlight to at least one user of the target group. Embodiments of step 460 determine an information item from an FV as described in connection with presentation engine 280 and presentation component 220.

Figure 5:
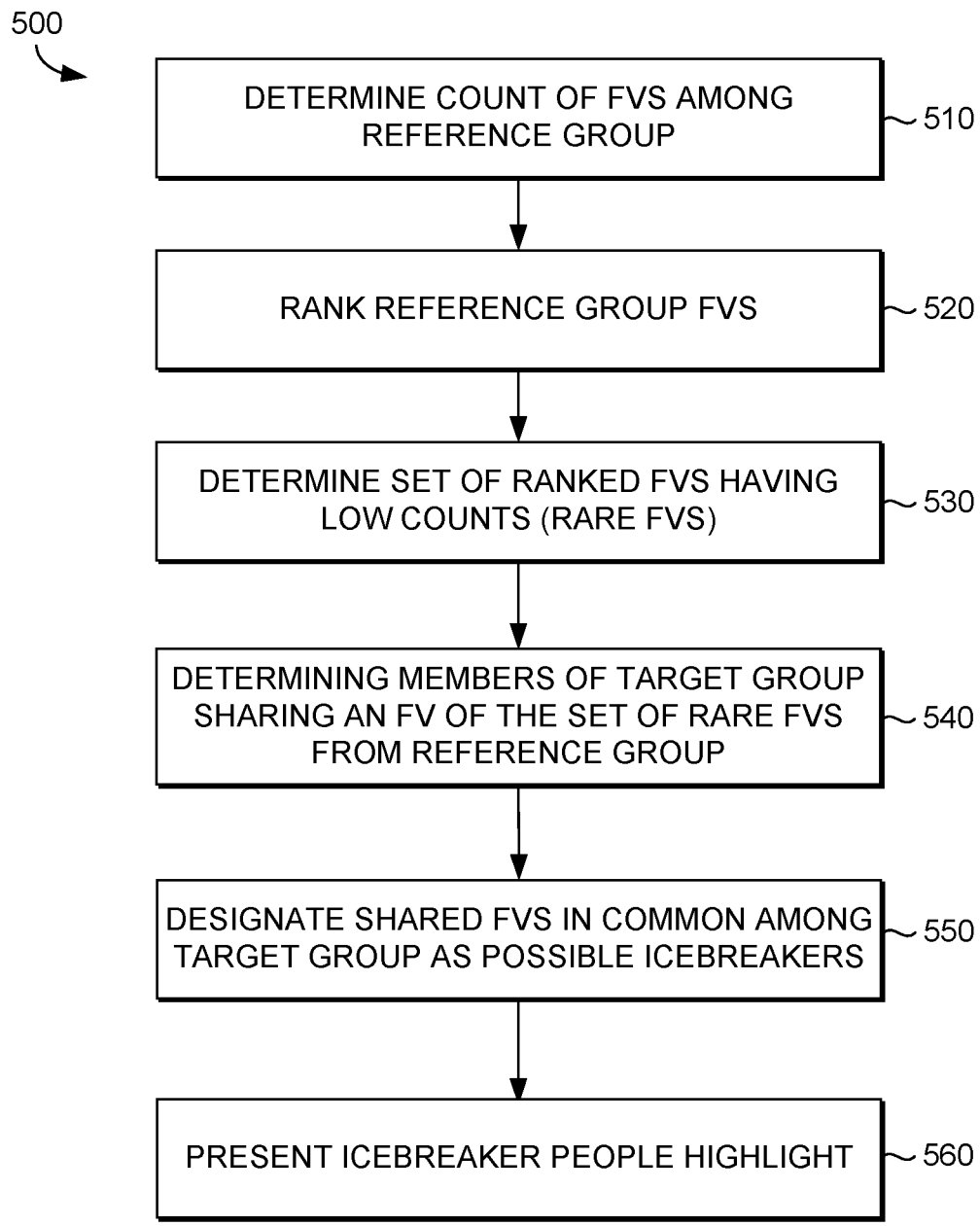
FIG. 5 depicts a flow diagram of another aspect of a method for intelligently selecting and presenting icebreaker people highlights to a user, in accordance with an embodiment of the present disclosure.

Turning to FIG. 5, a method 500 is shown for determining and presenting an icebreaker information item or icebreaker people highlight. As shown at 510, for a reference group of users, corresponding to a target group of users, step 510 determines a count of how often each FV occurs among users of the reference group. Thus, in step 510, a commonly occurring FV in the reference group will have a higher count. As shown at 520, the method 500 continues by ranking the reference group FVs based on the determined count of each FV (from step 510). In step 530, from the ranked reference group FVs, the logic of method 500 determines a set of FVs that have a low corresponding count, which may be referred to as the set of rare reference group FVs. In some embodiments step 530 takes the set of n FVs having the lowest count ranking, where n is an integer from 1-10. In some embodiments, step 530 comprises determining FVs having a count that is in the bottom $25^{th}$ percentile (or bottom $20^{th}$ percentile, or bottom $15^{th}$ percentile, or bottom $10^{th}$ percentile, or bottom $5^{th}$ percentile or similar percentile less than 50 percent). In some embodiments, step 530 comprises determining a standard deviation and a mean of the count values for the FVs and determining a set of FVs having a count that is less than two standard deviations below the mean. Similarly in another embodiment the set of FVs having a count that is less than 1 standard deviation below the mean is determined. In some embodiments, the set of rare reference group FVs may be null.

The method 500 continues at step 540, by determining members of the target group that share at least one FV in the set of rare reference group FVs. In step 550, for each FV in the set of rare reference group FVs that is shared by at least two members of the target group, the method designates that FV as a rare FV thereby forming a set of rare FVs as possible icebreaker people highlights. In step 560, the method concludes by presenting an indication of at least one rare FV as an icebreaker people highlight or information item on a user device associated with at least one user of the target group. Embodiments of step 560 may be performed as described in connection with step 460 of method 400 (FIG. 4).

While not shown, method 500 may include first determining a reference group as discussed above with respect to step 430 of method 400 and/or determining a target group as discussed above with respect to step 410 of method 400. Further, the method 500 may include determining FV-structured data (in the format described in connection with data converter 260) for each user in the reference group, based on receiving source data that comprises unstructured source data, semi-structured source data, and/or structured source data.

Example of information item (icebreaker) people highlights that may be determined and presented according to an embodiment of method 400 or method 500:

Example 1: "You and Lars both speak Elfdalian." Example 1 may be determined based on schematized sources of information (e.g., user graphs) for each user in the target group. Example 2: "You and Aleksander both visited Greenland last month." Example 2 may be determined based on user activity information that is converted into structured data (e.g., via data converter 260). Other examples discussed above in connection with FIGS. 2-3C are also within the scope of method 400 and method 500 and the preceding two examples are not meant in any way to be limiting.

Figure 6:
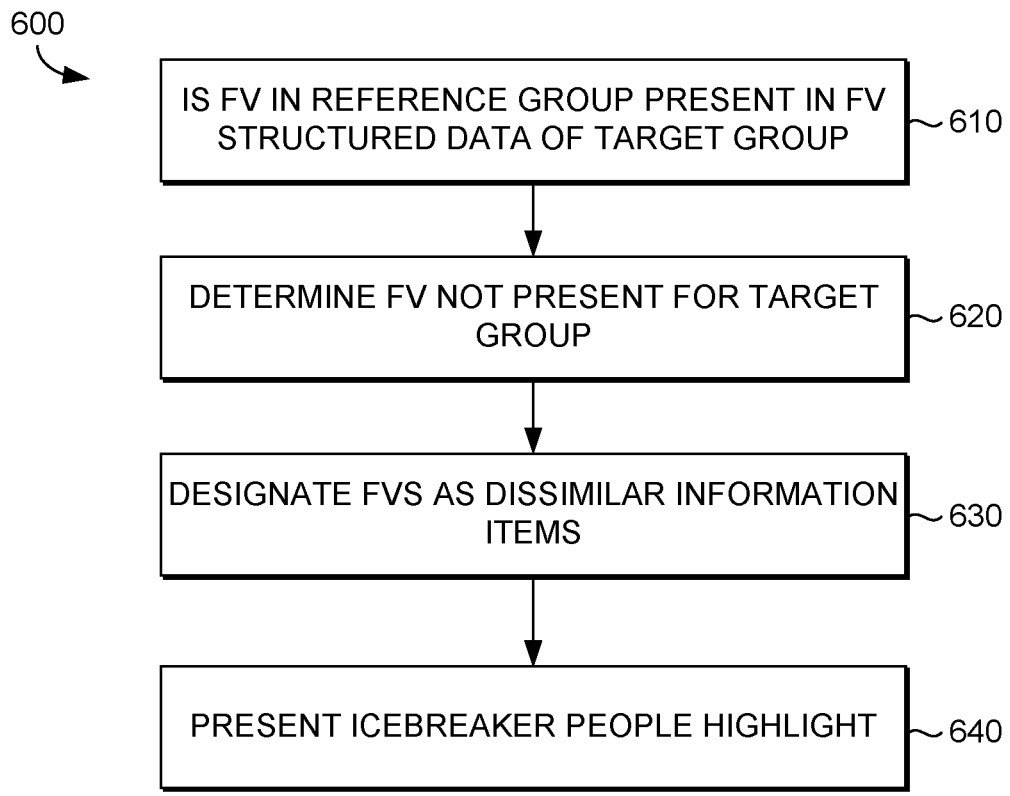
FIG. 6 depicts a flow diagram of yet another aspect of a method for intelligently selecting and presenting icebreaker people highlights to a user, in accordance with an embodiment of the present disclosure.

Turning to FIG. 6, a method 600 is shown for determining and presenting an information item (icebreaker) people highlight based on a dissimilarity. In step 610, for a reference group of users corresponding to a target group of users, and for each FV in the structured data of each user in the reference group, a comparison is performed to determine if that FV is present in the structured data of each user in the target group. Based on the comparison, step 620 determines that the FV is not present in the structured data of each user in the target group. In step 630, as a result of determination of step 620, the method 600 designates the FV determined to be not present in the structured data of each user in the target group as a dissimilar information item, thereby forming a set of one or more dissimilar information items. In step 640, the method 600 presents an indication of the at least one dissimilar information item on a user device associated with at least one user of the target group as an icebreaker people highlight. One example of an information item (icebreaker) people highlight that may be determined and presented according to an embodiment of method 600, the icebreaker people highlight would be: "You, Ola, and Omri are the only people in Acme Co who don't like sports."

Accordingly, we have described various aspects of technology directed to systems and methods for intelligently selecting and presenting icebreaker people highlights on personal computing devices. It is understood that various features, sub-combinations, and modifications of the embodiments described herein are of utility and may be employed in other embodiments without reference to other features or sub-combinations. Moreover, the order and sequences of steps shown in the example methods 400, 500, and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise selecting a people highlight data item to be shown on at least one user device. The operations may include determining a target group of users and programmatically determining at least one feature value in common among the target group of users thereby forming a set of common target group feature values. The operations may further include programmatically determining a reference group related to the target group, and for each feature value in the set of common target group feature values, determining a frequency of the feature value with respect to the determined reference group. The operations may further include, based on the determined frequency, causing to present on the at least one user device, at least one icebreaker people highlight from the determined set of common target group feature values. In this way, embodiments of this disclosure enable an improved user experience across a number of computer devices, applications and platforms. Also in this way, embodiments, as described herein, enable very large scale of operations created by software-based services that cannot be managed by humans to operate in an efficient manner while determining and presenting useful icebreaker people highlights. Further, in this way, embodiments, as described herein, cause certain, rare data items shared among two or more users to be programmatically surfaced and presented without requiring a computer tools and resources for a user to manually perform operations to produce this outcome. Still further, in this way, embodiments, as described herein, reduce or eliminate a need for certain databases, data storage, and computer controls for enabling manually performed steps by an administrator, to search, identify and assess, and configure (e.g., by hard-coding) specific, static information items to be presented to users, such as always showing common education backgrounds, as described herein.

In any combination of the above embodiments of the computerized system, the operations can further comprise determining a set of rare feature values based upon the determined frequency of each feature value, in the set of common target group feature values, with respect to the reference group, wherein the at least one icebreaker people highlight that is caused to be presented is selected from the determined set of rare feature values.

In any combination of the above embodiments of the computerized system, the operations can further comprise ranking the determined set of rare feature values, and the at least one icebreaker people highlight that is caused to be presented is selected based on the ranking.

In any combination of the above embodiments of the computerized system, the at least one icebreaker people highlight that is selected based on the ranking is a feature value, of the set of rare feature values, having the lowest determined frequency.

In any combination of the above embodiments of the computerized system, the operations can further comprise applying a rarity threshold against the determined frequency of each feature value in the set of common target group feature values, and the feature value is caused to be presented as the at least one icebreaker people highlight only if the determined frequency of the feature value is below the rarity threshold.

In any combination of the above embodiments of the computerized system, the rarity threshold varies according to a feature type corresponding to each feature value in the set of common target group feature values.

In any combination of the above embodiments of the computerized system, the target group of users is determined dynamically and changes as users interact with the at least one user device, and the at least one icebreaker people highlight, that is caused to be presented, changes dynamically according to the target group.

In any combination of the above embodiments of the computerized system, the operations for determining the at least one feature value in common among the target group of users comprises converting at least a portion of unstructured data into a structured feature-value format, the unstructured data including user activity data.

In other embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise instructions for implementing a method for selecting at least one icebreaker people highlight, with respect to a person of interest, to be shown on one or more user devices. The operations comprise monitoring the at least one user device to determine a possible user interest in a person of interest and determining a set of at least one feature values for a reference group related to the user. The operations may further comprise determining an occurrence count for each feature value in the set of at least one feature values for the reference group, and determining at least one feature value, in the set of at least one feature values for the reference group, having a low occurrence count based upon the determined occurrences count, thereby forming a set of rare reference group feature values. The operations may further comprise programmatically determining a set of common feature values for members of a target group associated with the user that are also feature values within the set of rare reference group feature values; and causing to present on the at least one user device as an icebreaker people highlight, at least one of the feature values from the set of common feature values for members of the target group associated with the user that are also feature values within the determined set of rare reference group feature values. In this way, embodiments of this disclosure enable an improved user experience across a number of computer devices, applications and platforms. Also in this way, embodiments, as described herein, enable very large scale of operations created by software-based services that cannot be managed by humans to operate in an efficient manner while determining and presenting useful icebreaker people highlights. Further, in this way, embodiments, as described herein, cause certain, rare data items shared among two or more users to be programmatically surfaced and presented without requiring a computer tools and resources for a user to manually perform operations to produce this outcome. Still further, in this way, embodiments, as described herein, reduce or eliminate a need for certain databases, data storage, and computer controls for enabling manually performed steps by an administrator, to search, identify and assess, and configure (e.g., by hard-coding) specific, static information items to be presented to users, such as always showing common education backgrounds, as described herein.

In any combination of the above embodiments of the computerized system, the operations can further comprise ranking the determined set of rare reference group feature values based upon the determined occurrences count to create a ranked subset of rare reference group feature values, wherein the causing to present on the at least one user device of at least one icebreaker people highlight is based on the ranking.

In any combination of the above embodiments of the computerized system, the operations can further comprise causing to present only a determined selected portion of the ranked subset of rare reference group feature values.

In any combination of the above embodiments of the computerized system, the causing to present the determined selected portion on the at least one user device selects to present the feature value in the ranked subset of rare reference group feature values having the lowest occurrence count that is also from the set of common feature values for members of the target group associated with the user.

In any combination of the above embodiments of the computerized system, the causing to present the determined selected portion on the at least one user device comprises selecting a pseudo randomly chosen feature value from among the set of common feature values for members of the target group associated with the user that are also feature values within the determined set of rare reference group feature values.

In any combination of the above embodiments of the computerized system, the at least one feature value having a low occurrence count is determined by applying a rarity threshold against the set of at least one feature values for the reference group, and determining that the occurrences count, of the at least one feature value having a low occurrence count, is below the rarity threshold.

In any combination of the above embodiments of the computerized system, the operations can further comprise causing to present a different icebreaker people highlight if the target group changes.

In other embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise instructions for implementing a method for selecting at least one icebreaker people highlight, with respect to a person of interest, to present on at least one user device. The operations comprise determining a target group of users including at least the person of interest and determining a set of feature values for users in the target group of users. The operations may further comprise programmatically determining a reference group related to the target group and determining a set of feature values for users in the determined reference group. The operations may further comprise programmatically determining a set of feature values for users in the reference group but that are absent from users in the target group; and presenting, on the at least one user device, at least one icebreaker people highlight from the determined set of feature values for users in the reference group but that are absent from users in the target group. In this way, embodiments of this disclosure enable an improved user experience across a number of computer devices, applications and platforms. Also in this way, embodiments, as described herein, enable very large scale of operations created by software-based services that cannot be managed by humans to operate in an efficient manner while determining and presenting useful icebreaker people highlights. Further, in this way, embodiments, as described herein, cause certain, rare data items shared among two or more users to be programmatically surfaced and presented without requiring a computer tools and resources for a user to manually perform operations to produce this outcome. Still further, in this way, embodiments, as described herein, reduce or eliminate a need for certain databases, data storage, and computer controls for enabling manually performed steps by an administrator, to search, identify and assess, and configure (e.g., by hard-coding) specific, static information items to be presented to users, such as always showing common education backgrounds, as described herein.

In any combination of the above embodiments of the computerized system, the operations can further comprise determining that the users of the target group of users has changed and presenting, on the at least one user device, a different icebreaker people highlight based on the change.

In any combination of the above embodiments of the computerized system, the operations can further comprise determining an occurrence frequency of a feature value for users in the reference group; applying a threshold against the occurrence frequency to determine a set of popular feature values of the reference group; and selecting for presenting, on the at least one user device as the at least one icebreaker people highlight, a first feature value from the set of popular feature values of the reference group.

In any combination of the above embodiments of the computerized system, the selected first feature value has the highest determined occurrence frequency.

In any combination of the above embodiments of the computerized system, the at least one icebreaker people highlight is presented on a graphical user interface associated with an on-line meeting, communications, or collaboration platform.

Figure 7:
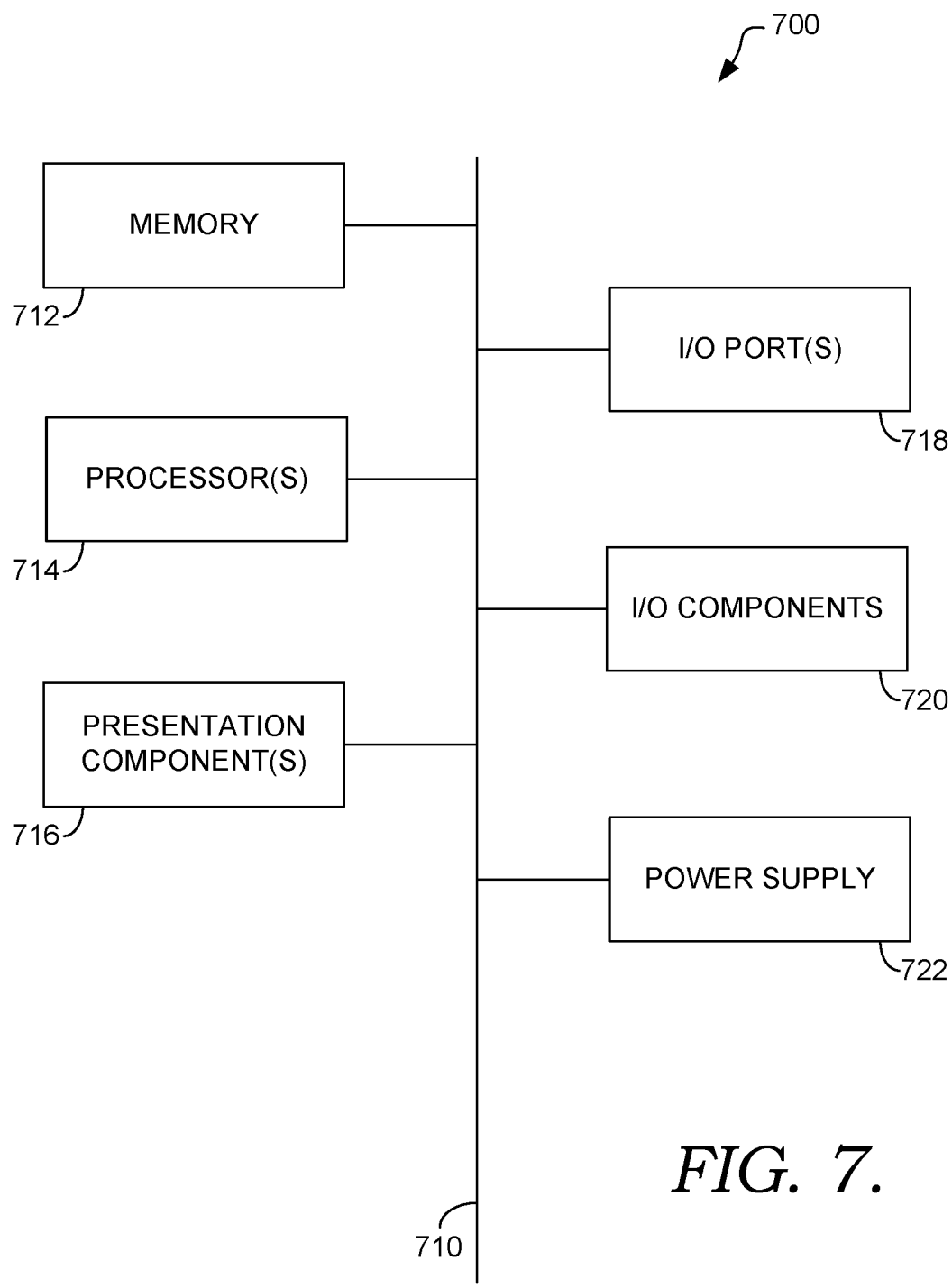
FIG. 7 is a block diagram of an exemplary computing environment suitable for use in implementing an embodiment of the present disclosure.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," or "handheld device," as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include for example solid-state memory, hard drives, and optical-disc drives. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, or a wireless device. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) (or similar wireless communication components). The radio transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computing system for selecting at least one icebreaker people highlight, with respect to a person in a target group, to be shown on at least one user device, comprising:
    at least one processor; and
    computer storage memory having computer-executable instructions stored thereon which, when executed by the at least one processor, implement a method for selecting a people highlight to be shown on the at least one user device, the method comprising:
        determining a target group of users participating in a web-based communication session,
        programmatically determining a reference group of users related to the target group, each user in the target group and the reference group being represented as a data structure including feature-value relationships represented as feature-value pairs;
        programmatically determining, based on a comparison of the data structure corresponding to each user in the target group, at least one feature value in common among the target group of users thereby forming a set of common target group feature values;
        for each feature value in the set of common target group feature values, determining a frequency of the feature value with respect to the feature-value pairs for the users in the reference group;
        based upon the frequency of each feature value in the set of common target group feature values, determining a set of rare feature values shared among the target group of users that are uncommon among users in the reference group;
        selecting a pseudo-randomly chosen feature value from among the set of rare feature values; and
        presenting, by a communication application, the pseudo-randomly chosen feature value as an icebreaker people highlight on a user interface facilitating the web-based communication session.

2. The computing system of claim 1, wherein the method further comprises:
    determining a set of rare feature values based upon the frequency of each feature value, in the set of common target group feature values, with respect to the reference group,
    wherein the icebreaker people highlight that is caused to be presented is selected from the set of rare feature values.

3. The computing system of claim 2, further comprising ranking the set of rare feature values, wherein the icebreaker people highlight that is caused to be presented is selected based on the ranking.

4. The computing system of claim 3, wherein the icebreaker people highlight that is selected based on the ranking is a feature value, of the set of rare feature values, having a lowest determined frequency.

5. The computing system of claim 1, further comprising applying a rarity threshold against the frequency of each feature value in the set of common target group feature values, wherein the feature value is caused to be presented as the icebreaker people highlight only if the frequency of the feature value is below the rarity threshold.

6. The computing system of claim 5, wherein the rarity threshold varies according to a feature type corresponding to each feature value in the set of common target group feature values.

7. The computing system of claim 1, wherein the target group of users is determined dynamically and changes as users interact with the at least one user device, and wherein the icebreaker people highlight, that is caused to be presented, changes dynamically according to the target group.

8. The computing system of claim 1, wherein determining the at least one feature value in common among the target group of users comprises converting at least a portion of unstructured data into a structured feature-value format, the unstructured data including user activity data.

9. A computer-performed method for selecting an icebreaker people highlight, with respect to a person of interest, to be shown on at least one user device, the method comprising:
    monitoring the at least one user device to determine a possible user interest in a person of interest;
    determining a set of feature values for a reference group of users, the reference group related to the user;
    determining an occurrence count for each feature value in the set of feature values for the reference group;
    determining at least one feature value, in the set of feature values for the reference group, having a low occurrence count based upon the occurrences count, thereby forming a set of rare reference group feature values;
    programmatically determining a set of common feature values for members of a target group associated with the user that are also feature values within the set of rare reference group feature values, the target group including users participating in a web-based communication session;
    selecting a pseudo randomly chosen feature value from among the set of common feature values for members of the target group associated with the user that are also feature values within the set of rare reference group feature values; and causing to present on the at least one user device the pseudo randomly chosen feature as an icebreaker people highlight on a user interface facilitating the web-based communication session.

10. The method of claim 9, further comprising ranking the set of rare reference group feature values based upon the occurrences count to create a ranked subset of rare reference group feature values, wherein the causing to present on is based on the ranking.

11. The method of claim 10, further comprising causing to present only a determined selected portion of the ranked subset of rare reference group feature values.

12. The method of claim 11, wherein the causing to present the selected portion on the at least one user device selects to present the feature value in the ranked subset of rare reference group feature values having a lowest occurrence count that is also from the set of common feature values for members of the target group associated with the user.

13. The method of claim 9, wherein the at least one feature value having a low occurrence count is determined by applying a rarity threshold against the set of at least one feature values for the reference group, and determining that the occurrences count, of the at least one feature value having a low occurrence count, is below the rarity threshold.

14. The method of claim 9, further comprising causing to present a different icebreaker people highlight if the target group changes.

15. A computer-performed method for selecting an icebreaker people highlight, with respect to a person of interest, to present on at least one user device, the method comprising:
   determining a target group of users participating in a web-based communication session, each user in the target group of users being represented as a data structure including feature-value relationships represented as feature-value pairs;
   determining a set of common target group feature values for users in the target group of users;
   programmatically determining a reference group related to the target group, the reference group including users represented by the data structure including feature-value relationships represented as the feature-value pairs;
   determining, based on a comparison of the feature-value pairs for the target group of users, a frequency of each feature in the set of common target group feature values;
   determining, based upon the frequency of each feature value in the set of common target group features, a set of rare feature values shared among the target group of users that are absent among users in the in the reference group;
   selecting a pseudo-randomly chosen feature value from among the set of rare feature values; and
   presenting, on the at least one user device, the pseudo-randomly chosen feature value as an icebreaker people highlight in association with the web-based communication session.

16. The method of claim 15, further comprising determining that the users of the target group of users has changed and presenting, on the at least one user device, a different icebreaker people highlight based on the change.

17. The method of claim 15, further comprising:
   determining an occurrence frequency of a feature value for users in the reference group;
   applying a threshold against the occurrence frequency to determine a set of popular feature values of the reference group; and
   selecting for presenting, on the at least one user device as the icebreaker people highlight, a first feature value from the set of popular feature values of the reference group.

18. The method of claim 17 wherein the selected first feature value has a highest determined occurrence frequency.

19. The method of claim 15, wherein the icebreaker people highlight is presented on a graphical user interface associated with an on-line meeting, communications, or collaboration platform.

\* \* \* \* \*